UNITED STATES PATENT OFFICE.

WILLIAM O. CALLENDER, OF LONDON, ENGLAND.

COMPOSITION OF MATTER FOR INSULATING TELEGRAPH-WIRES AND FOR OTHER PURPOSES.

SPECIFICATION forming part of Letters Patent No. 264,821, dated September 19, 1882.

Application filed April 6, 1882. (Specimens.) Patented in England October 11, 1881; in Italy February 27, 1882; in Belgium February 28, 1882; in France April 24, 1882, and in Spain July 1, 1882.

*To all whom it may concern:*

Be it known that I, WILLIAM ORMISTON CALLENDER, of No. 101 Leadenhall Street, in the city of London, England, have invented an Improved Composition of Matter for Insulating Telegraph-Wires and for other Purposes, of which the following is a specification.

This invention consists in the new composition of matter formed by the combination of bitumen with the hereinafter-mentioned hydrocarbon or its equivalent and sulphur or its equivalent, the whole being subjected to heat in such manner as to produce a vulcanized material, as hereinafter explained.

My invention also comprises a novel process, which I have found advantageous in the production of my said novel composition of matter.

In the practice of my said invention I take from forty to eighty parts of the bitumen and combine it with from twenty to sixty parts of the hydrocarbon. The bitumen is that well known as a natural deposit, and used in its natural state when found sufficiently pure, or refined in the usual way when such refining or purification is necessary. The bitumen which I find most advantageous for use is that obtained from Trinidad. The other hydrocarbon which I use in connection with the bitumen is preferably the oil-residue obtained by subjecting vegetable or other oils to treatment for such a time and in such a manner as to leave the residue in an elastic condition, with a specific gravity as near 1.00 as possible, and by preference not more than 1.10. Preferably I obtain such residue from vegetable oil—such as cotton-seed oil or palm-oil—by the distillation of such oils with preferably the admixture of an acid—such as sulphuric acid or nitric acid—until the specific gravity of the residue is about from 1.00 to 1.10, and which becomes soft and elastic at a temperature of about 60° Fahrenheit. An equivalent material for the purposes of my invention may be obtained by melting the residue usually obtained from the distillation of vegetable oils and mixing therewith such a quantity or proportion of sulphuric or nitric acid or of spirit as will cause the same to become elastic and have a specific gravity of 1.00 to 1.10. In place of the residue or hydrocarbon substance just mentioned I may use a substance called "elastikon," which is an article well known and commonly sold in the markets of Great Britain, and which bears a very close resemblance to the residues aforesaid, and is suitable for use in place thereof, so far as concerns my said invention.

My preferred method of manufacture is as follows: I melt or dissolve by heat thirty-five parts of the bitumen, and at the same time, in a separate vessel or caldron, I melt or dissolve thirty-five parts of the oil-residue or its equivalent. I find it advantageous to add to each of the components—namely, to the bitumen and to the oil-residue or its equivalent—from three to four parts of any vegetable oil. The bitumen and the oil-residue or its equivalent being thoroughly dissolved, the materials, in liquid or semi-liquid condition, are mixed at a temperature of from 220° to 250° Fahrenheit. There may be added at this point three parts of ozocerite or other equivalent wax; but I do not consider this as absolutely essential. The two essential components—namely, the bitumen and the oil-residue or its equivalent—being mingled as aforesaid, the temperature thereof is raised to from 280° to 290°; and to the proportions aforesaid I add, say, from three to four parts of sulphur, preferably in the form of flowers of sulphur, or other substance capable of producing a vulcanizing effect by the subsequent treatment. The temperature is then raised to, say, 340° Fahrenheit, the mixture being stirred gently for about forty-five minutes, whereupon it is found to have been brought into a thick elastic condition. It is retained at the temperature aforesaid for a further period of, say, two hours, after which, upon cooling, the resultant product is a compound substance which I have found to be suitable for use as a non-conductor of electricity, as waterproofing material, and also capable of various other purposes for which india-rubber, gutta-percha, &c., are frequently employed.

I wish it to be fully understood that I do not limit myself to precisely the proportions herein set forth, nor do I limit myself precisely to the limits of time in the operation of manufacture herein indicated, nor to the precise limits of temperature above stated, as these may be varied simply as a mere matter of judgment on the part of the operator; neither do I limit myself to the use of sulphur as the vulcanizing material or agent, inasmuch as any of the known equivalents of sulphur for vulcanizing purposes may be used in its stead.

I do not claim the use of oil as such in connection with the other substances termed "coal-tar" or its equivalent, a resinous body and sulphur, as set forth in the patents of A. G. Day, Nos. 210,411, 210,410, 210,408, 210,405, and British Patent No. 1,010 of A. D. 1871, as a material made from said compounds and formulas is essentially different from that resulting from the materials herein described and claimed.

What I claim as my invention is—

The composition herein described for insulating telegraph wires and cables, the same consisting of natural asphaltum or natural bitumen, elastikon, or a residual product of vegetable oils, substantially such as described, and sulphur or other vulcanizing agents, when combined in the manner and about in the proportions set forth.

Witness my hand this 20th day of March, A. D. 1882.

WILLIAM ORMISTON CALLENDER.

Witnesses:
J. EDW. BEESLEY,
G. S. PURRY,
*Both of 2 Pope's Head Alley, Cornhill, London, Gents.*